May 28, 1946.  G. A. TINNERMAN  2,401,202

FASTENING DEVICE

Filed March 18, 1944

INVENTOR.
GEORGE A. TINNERMAN
BY
ATTORNEYS

Patented May 28, 1946

2,401,202

UNITED STATES PATENT OFFICE 2,401,202

FASTENING DEVICE

George A. Tinnerman, Cleveland, Ohio, assignor to Tinnerman Products, Inc., Cleveland, Ohio, a corporation of Ohio Application March 18, 1944, Serial No. 527,052

9 Claims. (Cl. 85—32)

This invention relates to a fastening device that is adapted to be used in connection with a stud, such as a bolt or the like, for holding a plurality of parts together, whereby the stud may be securely locked in place and yet the end thereof may be concealed from view.

Frequently, assemblies require the use of one or more bolts wherein the bolts must be applied from the concealed side as a result of which the ends of the bolts are exposed to view and are, therefore, detrimental and unsightly. Where a sheet metal nut is used, in connection with the bolt, there is an increased danger of having it exposed to view along with the bolt, particularly on machinery where moving parts are involved, or where the appearance of the article is an important factor.

An object of the present invention is to provide a sheet metal fastener that is adapted to coact with a stud for the purpose of holding articles together, and to so design the fastener that it may be utilized with a moldable cap, button or strip, so as to conceal the end of the bolt and to provide a covering device which is attractive in appearance. A further object of the present invention is to so make the connection between the fastening device and the cap that the connection may be made to the bolt either before or after the cap is attached to the assembly. While it is desired to apply the cap before the assembly is completed, nevertheless the invention contemplates an interfitting connection between the cap and device, whereby the device may be held in self-sustaining, bolt receiving position thereon, and whereby the device is held against rotation with reference to the cap during the bolt applying operation.

Figure 1:
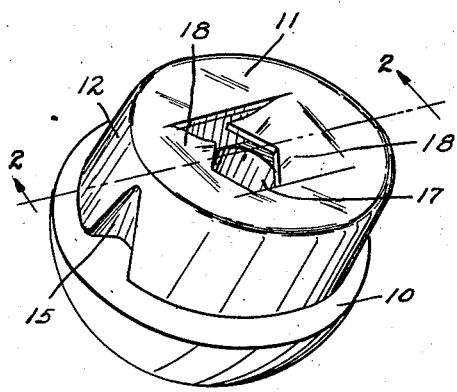
Figure 3:
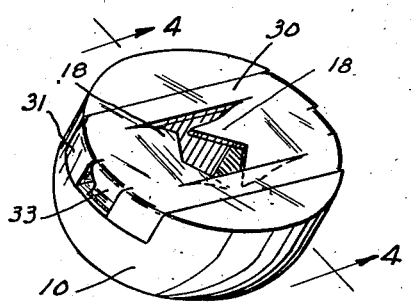
Figure 2:
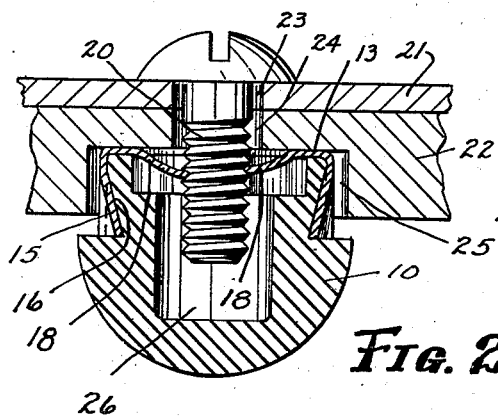
Figure 5:
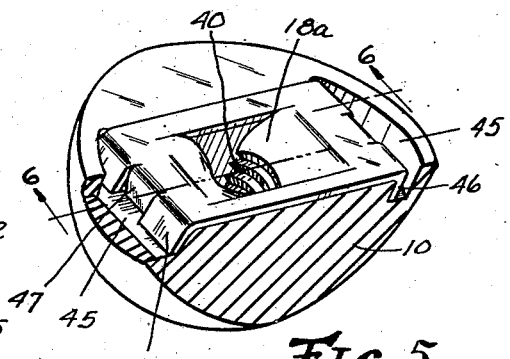
Figure 4:
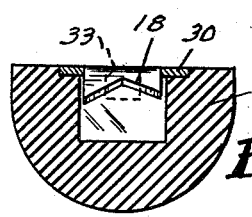
Figure 6:
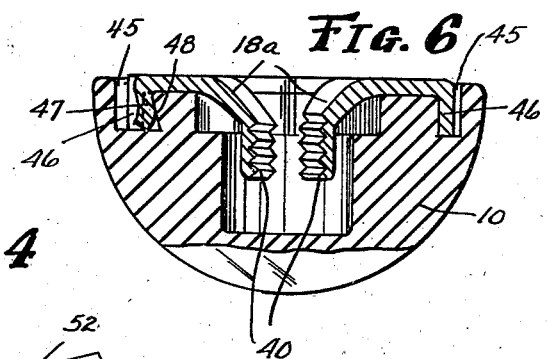
Figure 7:
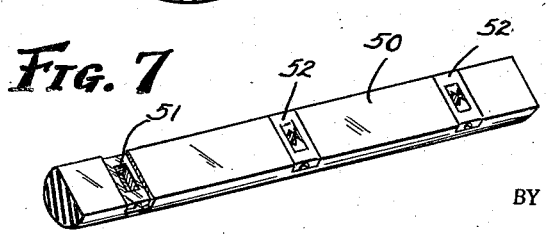

Referring now to the drawing, Fig. 1 is a perspective view of a fastening device embodying my invention as applied to a dome-shaped cap; Fig. 2 is a section taken on a plane indicated by the line 2—2 in Fig. 1, and showing the cap as applied to a supporting structure; Fig. 3 is a perspective view of a modified form of fastening device for use with a dome-shaped cap; Fig. 4 is a transverse section taken on a plane indicated by the line 4—4 in Fig. 3; Fig. 5 is a perspective view showing a modified form of fastener construction; Fig 6 is a section taken on a plane indicated by the line 6—6 in Fig. 5, and Fig. 7 is a perspective view showing the use of a fastener like that shown in Fig. 3 or 5 with a molding strip.

Considering first the invention illustrated in Figs. 1 and 2, the fastening device is made of sheet material, such as metal, and is applied to a dome-shaped cap, indicated at 10. The fastener in this embodiment has a cup-shaped body which is shown in inverted form as being attached to the rearward portion of the cap. The body of the fastener thus has a bottom wall 11 and a circular peripheral flange portion 12 which embraces an extension 13 on one end of the cap. The flange portion of the body may be clamped to the shank of the cap by means of opposed indentations 15 which are pressed into complementary shaped recesses 16 in the cap extension. Such arrangement provides coacting shoulders on the cap and fastener, not only to prevent the fastener from moving axially with respect to the cap, but also from being rotated with reference thereto.

The fastening device of Fig. 1 has an opening 17 therein for receiving the shank of a threaded member, such as a bolt, screw or the like, and the body carries thread engaging portions adjacent the region of the opening for engaging the threaded shank as is illustrated at 20 in Fig. 2. Preferably, the thread engaging portions on the body comprise fingers that are integral therewith and that extend out of the plane of the body in the same general direction as the side portions 12. Additionally, when the device is used with a threaded stud, the ends of the fingers are twisted with respect to each other so as to conform to the helix of the thread on the stud.

In Fig. 2, the assembly is illustrated in connection with two parts designated 21 and 22 which are adapted to be connected together by means of the bolt 20, and accordingly, the parts are provided with registering openings 23 and 24, respectively, which are in registration with the opening 17 in the body of the fastener. The part 22 may have a socket 25 therein into which the fastener and extension of the cap projects so that the dome-shaped portion of the cap conceals the end of the bolt and yet allows sufficient force to be exerted thereon for effecting a satisfactory connection between the bolt and the fastener. A suitable pocket 26 in the cap permits adequate space for receiving the end of the bolt and also for receiving the fingers 18 which comprise the thread engaging portions on the fastener. Preferably, the pocket is rectangular in cross-section whereby the walls of the pocket are adapted to engage the side edges of the fingers and thereby prevent rotation of the device with reference to the cap.

A modification of the invention is illustrated in Fig. 3, wherein the body of the fastener comprises a channel-shaped structure having a bottom portion 30 and flange portions 31, and wherein the cap is recessed to receive the bottom and flange portions, preferably in a manner such that the outer surfaces are flush with the surfaces of the cap. The cap may also have an undercut shoulder thereon similar to that indicated at 16 in Fig. 2, and at least one flange of the fastener may have a finger 33 formed therefrom and shaped complementary to the undercut portion of the cap to provide coacting interlocking shoulders by means of which the fastener may be held in snap fastening engagement with the cap. The fastener, like that of Fig. 1, has thread-engaging portions 18 which are adapted to engage the shank of a bolt, screw, or the like, as aforesaid. This arrangement is sufficient to retain the fastener in self-sustaining bolt receiving position and to hold the fastener against movement either axially or rotatively with reference to the cap. In this construction, as in the previous embodiment, the cap has an opening to receive the end of the bolt and to conceal it without in any way interfering with the holding power of the fastener when the bolt is applied thereto.

In Figs. 5 and 6 are shown a further modification, wherein the corresponding parts are indicated by the same numbers as those appearing in Fig. 3, but wherein the thread engaging portions are designed to effect multiple thread engagement instead of engaging a single turn of the bolt, as is the case in the preceding modification. As shown best at Fig. 6, the fingers 18a are turned inwardly toward each other and are extended a sufficient distance to have multiple threaded portions 40 thereon. Such thread engaging portions are curved transversely so as to be complementary to the shape of the bolt with which it is intended to be used. If desired, the cap may have pockets 45 spaced inwardly from the marginal portions thereof so as completely to conceal the fastener, as well as the end of the bolt with which it is used. In this modification, one flange 46 of the fastener may present a smooth, uninterrupted surface, while the other may have a finger 47 formed therein for engaging an undercut shoulder 48 in the pocket of the cap.

In Fig. 7, I have shown the fastener as applied to a trim strip 50 which is provided with spaced pockets 51 for receiving the shanks of bolts, and I have shown the strip as having suitable grooves to receive the fasteners 52 which may be formed in the manner indicated either in Fig. 3 or 5. This type of assembly is best adapted for installations where there is a regular spacing of the bolts, and where they are sufficiently close together that a trim strip would present a better appearance than a row of spaced buttons or knobs.

An important advantage of the present invention is that a sheet metal fastener may be satisfactorily used in connection with a bolt for obtaining the desired holding power between two parts that are adapted to be connected together, and yet the end of the bolt as well as the fastener, is substantially concealed from view. The invention is capable of various modifications as illustrated in the drawing, the essential features of which are summarized in the claims.

I claim:

1. A fastener comprising a sheet metal cup-shaped body having an opening in the bottom portion thereof and having thread engaging means carried thereby adjacent the opening, the side wall of said body having at least one indented portion thereon adapted to engage a complementary shaped recess in an article to which it is applied.

2. A sheet metal fastener having a cup-shaped body portion having an opening in the bottom thereof for receiving a bolt or the like, there being thread engaging portions carried by the bottom portion adjacent the opening, the side wall of the fastener having a shoulder formed therein and adapted to engage a coacting shoulder in a part to which the fastener may be applied for holding the fastener in self-sustaining, bolt receiving position thereon, and for preventing rotation of the fastener with reference to the article.

3. A device for concealing the end of a bolt comprising in combination, a sheet metal fastener having thread engaging fingers deformed therefrom, and a cap having a pocket into which the bolt and the thread engaging means on the fastener extend, the pocket in the cap having opposed walls against which the side edges of the fingers engage, whereby the fastener is held against rotation with reference to the cap during the tightening operation of said bolt.

4. A device for concealing the ends of a plurality of spaced bolts comprising in combination, a plurality of spaced bolts, a sheet metal fastener in threaded engagement with each bolt, and a strip having spaced pockets therein to receive and conceal the ends of the bolts, each of said fasteners having end flanges embracing the strip, one of said flanges overhanging a shoulder on said strip, whereby the strip may be held in snap fastening engagement with said fasteners.

5. A device for concealing the end of a bolt comprising in combination, a sheet metal fastener having thread engaging means thereon adapted to engage the threads of the bolt, and a cap frictionally engaging the fastener and having a pocket therein for receiving the end of the bolt, there being an inwardly extending shoulder on the fastener engaging an outwardly extending shoulder on the cap to retain the fastener in bolt receiving position, and to prevent rotation of the fastener with reference to the cap during the tightening operation of the bolt.

6. A device providing a nut and concealing the end of a bolt projecting through the nut comprising in combination a sheet metal fastener having an intermediate body portion with thread-engaging means carried thereby and having end flanges projecting in the same general direction at an angle to the body, one of the end flanges being intermediately indented inwardly, and a cap having recesses occupied by said end flanges and having a pocket into which the bolt may extend, the cap and one of the end flanges of the fastener interlocking with each other, whereby the fastener is held on the cap with a snap engagement and is also held automatically against rotation with reference to the cap during the tightening operation of the bolt.

7. In combination, a sheet metal fastener having a body portion with a bolt-receiving opening therein and with thread-engaging means carried thereby adjacent the opening, said fastener being formed with a flange at each end of the body portion, and a dome-shaped member having a pocket therein for receiving the end of the bolt, there being an interlocking connection between the end portions of the fastener and member, whereby the member may be applied to the fastener either before or after the bolt is applied thereto, and the member being recessed to receive the fastener and to make a flush surface connection therewith.

8. In combination, a fastener comprising a body of sheet metal having a base portion with a bolt receiving opening therein, the material of the base portion being diverted about the opening to provide a thread engager, and having marginal flange portions extending in the same general direction from the base as said diverted portion on opposite sides of the bolt opening, and an article having an internal recess to receive the thread-engager and the projecting end of a bolt passing therethrough, said article having also surfaces which said flange portion engage, whereby the fastener is held in self-sustaining bolt-receiving position and is prevented from rotating with reference to the article during the application of a bolt to the fastener.

9. In combination, a fastener comprising a body of sheet metal having a base portion with a bolt receiving opening therein, a thread-engager carried by the base portion in registration with the opening, said base portion having marginal flange portions extending in the same general direction from the base, at least one of the flange portions having a shoulder thereon extending inwardly toward said opening, and an article having an external non-annular undercut shoulder which the shoulder on the flange engages, whereby the fastener is held in self-sustaining position by the inter-engagement of said shoulders, and is prevented from rotating with reference to the article during the application of a bolt to the fastener.

GEORGE A. TINNERMAN.